(12) United States Patent
Long, Jr.

(10) Patent No.: US 8,297,465 B2
(45) Date of Patent: Oct. 30, 2012

(54) WEIGHT CASE

(75) Inventor: Thomas A. Long, Jr., Hockessin, DE (US)

(73) Assignee: Henry Troemner LLC, Thorofare, NJ (US)

( * ) Notice: Subject to any disclaimer, the term of this patent is extended or adjusted under 35 U.S.C. 154(b) by 465 days.

(21) Appl. No.: 12/548,087

(22) Filed: Aug. 26, 2009

(65) Prior Publication Data

US 2011/0049156 A1 Mar. 3, 2011

(51) Int. Cl.
*B65D 45/16* (2006.01)
(52) U.S. Cl. ..... 220/326; 220/4.21; 220/4.26; 220/4.27; 220/315; 220/528; 220/529
(58) Field of Classification Search ............... 220/4.26, 220/4.27, 315, 326, 528, 529, 4.21, 23.87
See application file for complete search history.

(56) References Cited

U.S. PATENT DOCUMENTS

| | | | |
|---|---|---|---|
| 1,923,457 A | 8/1933 | Reeves | |
| 3,235,062 A | 2/1966 | Myers | |
| 4,586,608 A | 5/1986 | Fegley | |
| 4,801,015 A | 1/1989 | Lubock | |
| 5,348,885 A | 9/1994 | Labarthe | |
| 6,119,872 A * | 9/2000 | Flores et al. | 211/40 |
| 7,121,405 B2 | 10/2006 | Itho | |

* cited by examiner

*Primary Examiner* — Anthony Stashick
*Assistant Examiner* — Elizabeth Volz
(74) *Attorney, Agent, or Firm* — Volpe and Koenig, P.C.

(57) ABSTRACT

A container for housing an object having a housing with an insert movably disposed within the housing to define a receptacle to receive the object. A lid is removably located on the housing to enclose the insert, with an object engaging portion of the lid being in contact with the object. The lid is rotatable on the housing from a first removal position, to a second locking position in which a locking projection on the lid engages a first counter structure on the housing. A driving projection on the lid engages a second counter structure on the insert to rotate the insert with the lid, so that the lid and insert do not move relative to the object as the lid moves to the locking position.

21 Claims, 7 Drawing Sheets

WEIGHT CASE

FIELD OF INVENTION

The invention relates generally to a container for storing an object, such as a precision weight.

BACKGROUND

Precision weights are often used for weighing of material or calibrating weighing equipment where a high degree of accuracy is required, for example in a laboratory setting. Over time, the accuracy of precision weights can be compromised by material being added or removed. Among the causes of addition or removal of material are environmental factors, such as temperature, humidity, and air quality. To avoid the effects of these factors, precision weights are often stored in containers that isolate the weight from the surrounding environment. Excessive handling or contact with other objects can also affect the accuracy of precision weights by removing material. In particular, when relative movement occurs between a precision weight and an object in contact with the weight, the friction generated can cause removal of a small amount of material from the weight.

SUMMARY

The invention addresses the above-mentioned problems by providing a container for storing an object, such as precision weight, that prevents relative movement between the container and the object. The container includes a housing. An insert movably disposed within the housing defines a receptacle to receive the object. A lid is removably located on the housing to enclose the insert, with an object engaging portion of the lid being in contact with the object. The lid is rotatable on the housing from a first removal position, to a second locking position in which a locking projection on the lid engages a first counter structure on the housing. A driving projection on the lid engages a second counter structure on the insert to rotate the insert with the lid, preventing relative movement between the object and the lid.

A combination of an object and a container for storing the object is provided as well. The container includes a housing. An insert is movably disposed within the housing and defines a receptacle having the object located therein. A lid is removably located on the housing and encloses the insert and the object, such that an object engaging portion of the lid is in contact with the object. The lid is rotatable on the housing from a first removal position, to a second locking position in which a locking projection on the lid engages a first counter structure on the housing. A driving projection on the lid engages a second counter structure on the insert to rotate the insert and the object with the lid.

A method of enclosing an object within a container is further provided. The method includes providing the container, which includes a housing, an insert that defines a receptacle movably disposed within the housing, and a lid. The object is placed in the receptacle, and the lid is placed over the housing such that an object engaging portion of the lid contacts the object. A driving projection on the lid is engaged with an insert counter structure. The lid is rotated with respect to the housing from a first removal position to a second locking position in which a locking projection of the lid engages a counter structure on the housing, while the insert is simultaneously rotated with the lid, preventing relative movement between the object, the insert, and the lid.

BRIEF DESCRIPTION OF THE DRAWINGS

The foregoing Summary, as well as the following Detailed Description, will be better understood when read in conjunction with the drawings, which show a presently preferred embodiment of the invention. In the drawings.

DETAILED DESCRIPTION OF THE PREFERRED EMBODIMENTS

Certain terminology is used in the following description for convenience only and is not considered limiting. Words such as "front," "back," "top," and "bottom" designate directions in the drawings to which reference is made. This terminology includes the words specifically noted above, derivatives thereof, and words of the same import. Additionally, the terms "a" and "one" are defined as including one or more of the referenced item unless specifically noted. The phrase "at least one of" followed by a list of two or more items, such as "A, B or C," means any individual one of A, B or C, as well as any combination thereof.

The preferred embodiments of the present invention are described below with reference to the drawing figures where like numerals represent like elements throughout.

With reference to FIGS. 1-8, a preferred embodiment of the container 10 is shown. The container 10 includes a housing 30, and an insert 50 is movably disposed within the housing 30, which is in particular, rotatable within the housing. The insert 50 includes a receptacle 52 that receives an object 12. In the embodiment shown the object 12 is a precision weight, although alternative embodiments of the container 10 configured to store other objects 12 are considered within the scope of the invention. A lid 70 is removably located on the housing 30 to enclose the insert 50 and the object 12. The lid 70 is rotatable on the housing 30 from a first removal position, shown in FIG. 8, in which the lid 70 can be removed by pulling in an upward direction from the housing 30, and a second locking position, shown in FIG. 1, in which the lid 70 is axially locked on the housing 30. As described in greater detail below, the insert 50 rotates with the lid 70 to further prevent relative movement between the weight 12, insert 50, and lid 70, when the lid 70 is being moved between the locking and unlocking positions.

As shown in FIGS. 1-3 and 8, the weight 12 is housed within a receptacle 52 that is part of the insert 50 located in the housing 30. In the embodiment shown, the weight 12 includes a cylindrical body 14 with a neck 16 extending upward therefrom, and a head 18 with a flat upper surface 20. The receptacle 52 has a cylindrical wall 54 with a base 56 closing off a bottom portion thereof. The weight 12 rests on the base 56 and is snugly enclosed by the cylindrical wall 54 to prevent it from shifting sideways within the receptacle 52. In other embodiments the weight 12, or other object seated in the receptacle 52, could take on other shapes, and receptacle 52 would be adapted accordingly to receive the object having such a shape.

Figure 2:
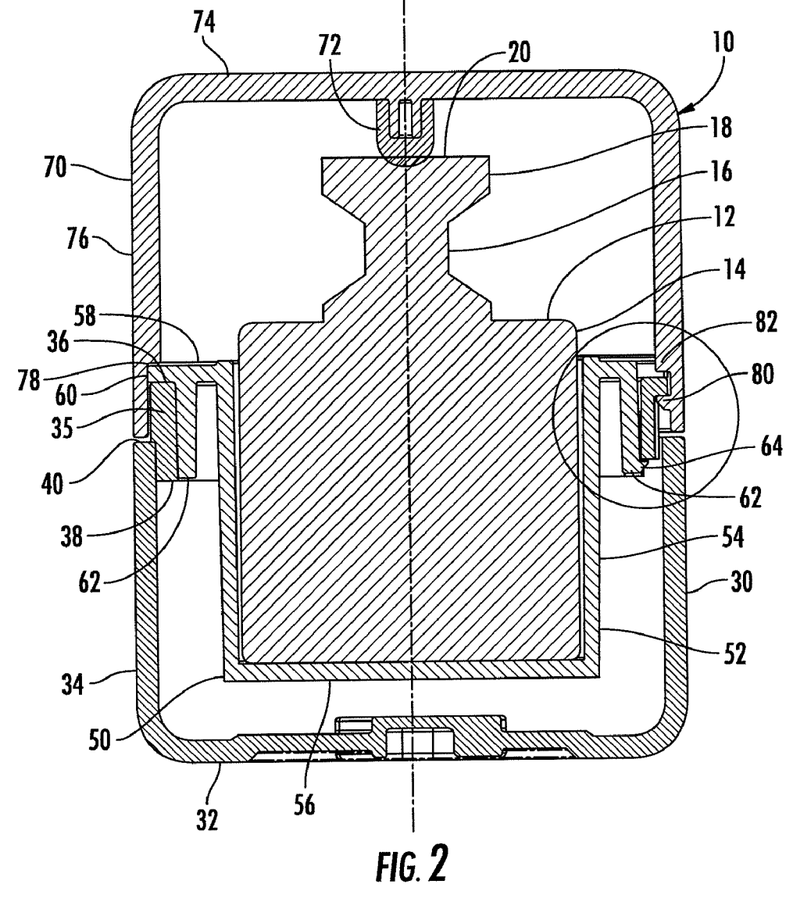
FIG. 2 is a cross section, taken along line 2-2 in FIG. 1.
Figure 4:
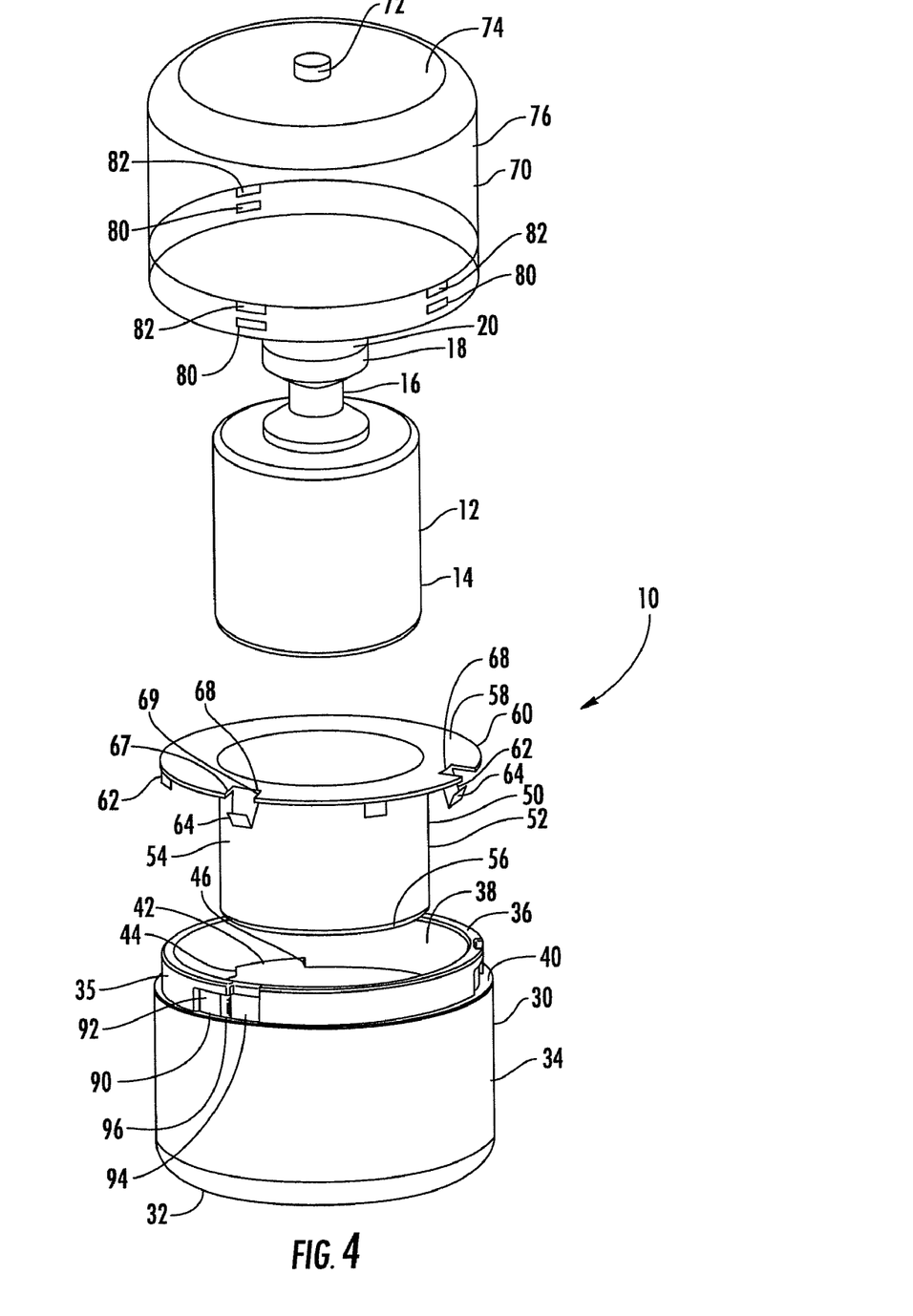
FIG. 4 is an exploded top perspective view of the weight case shown in FIG. 1.
Figure 5:
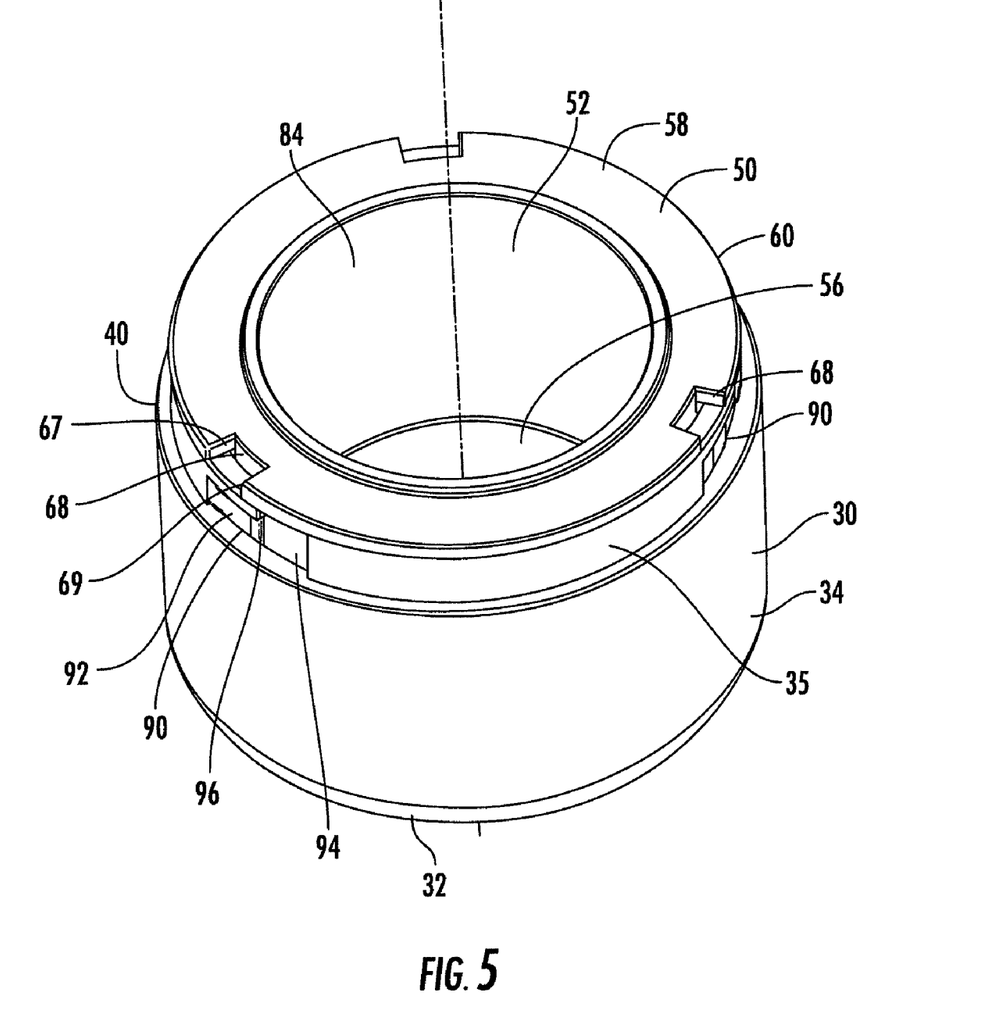
FIG. 5 is a top perspective view of the housing of FIG. 1, with the insert disposed therein.
Figure 6:
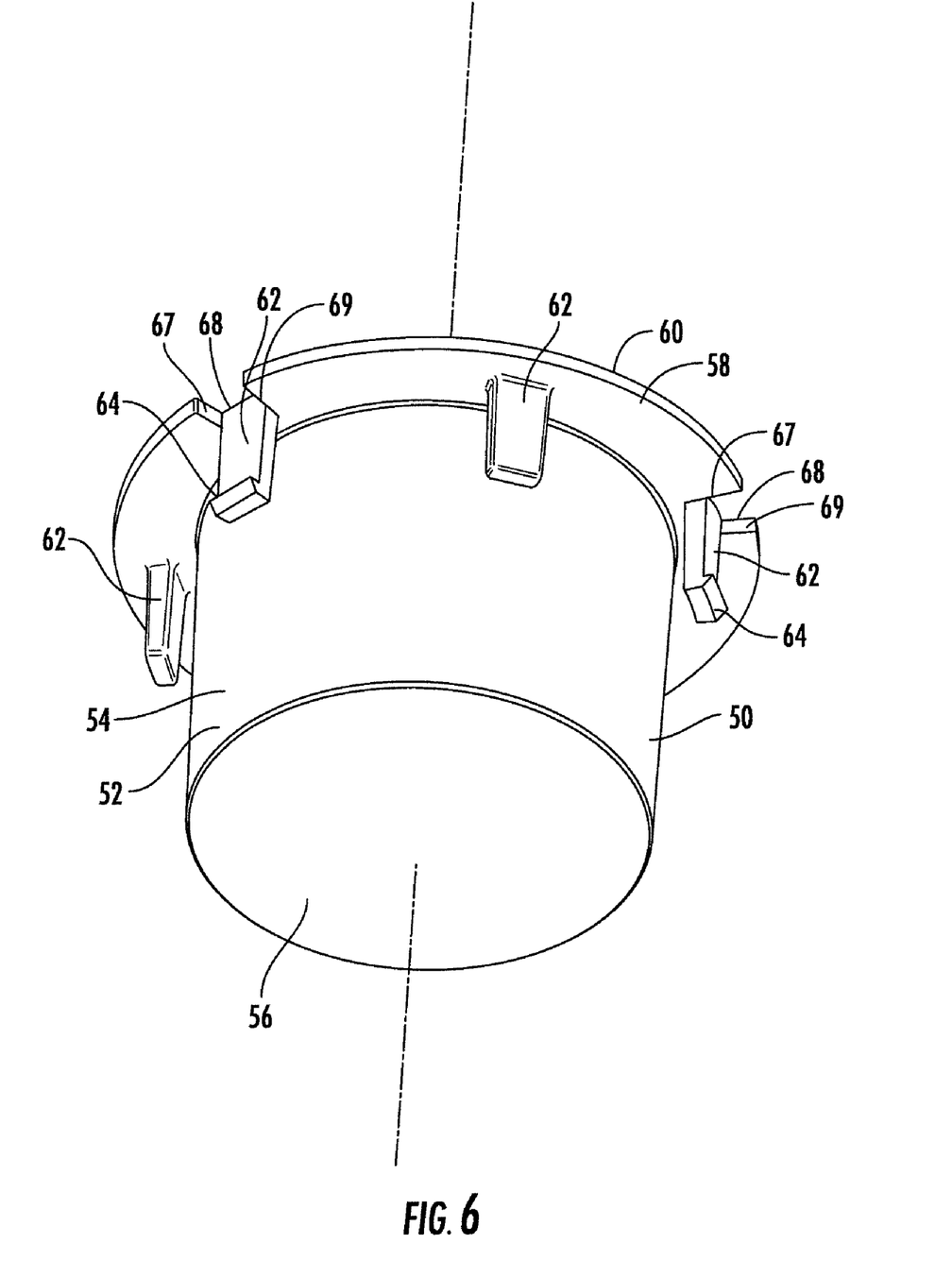
FIG. 6 is a bottom perspective view of the insert of FIG. 1.

The insert 50 is configured to be removably received by the housing 30, as shown in FIGS. 2, 4, and 5. As shown, the insert 50 includes a collar 58 that is supported by the housing 30. The collar 58 extends radially from an upper portion of the receptacle 52, and the receptacle 52 extends downward from the collar 58 and into the housing 30. The housing 30 preferably includes a base 32 and an annular wall 34 extending upward therefrom and forming a lower wall of the container 10. In the embodiment shown, an outer radial edge 60 of the collar 58 is supported by an upper edge 36 of the lower annular wall 34.

Figure 3:
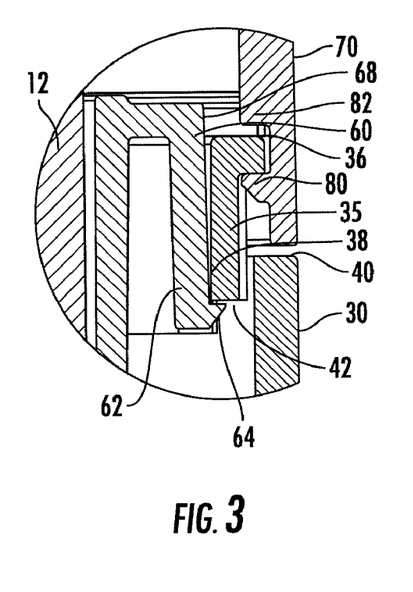
FIG. 3 is an enlarged detail of FIG. 2, showing the projections of the lid engaging the slot and circumferential portion of the L-shaped recess in the housing, as well as the hook portion of the insert engaging the slot of the housing.

With reference to FIGS. 2-4, a reduced diameter portion 35 is formed at an upper area of the lower annular wall 34, having both reduced inner and outer diameters with respect to the remainder of the lower annular wall 34. The reduced diameter portion 35 creates a lip 38 extending radially inwardly from an inner radial surface of the lower annular wall 34. Slots 42, shown in FIG. 4, are formed in the bottom of the lip 38. The slots 42 are cutout portions, creating a reduction in the axial thickness of the lip 38. In the embodiment shown, three slots 42 are provided at evenly spaced intervals along the circumferential extension of the lip 38, but fewer or more slots 42 could be provided as well.

Still referring to FIGS. 2-4, the lip 38 and the slots 42 facilitate removable engagement of the insert 50 within the housing 30. As shown, a plurality of tabs 62 extend downward from the collar 58. The tabs 62 of the embodiment shown are displaced from the outer radial edge 60 of the collar 58 by a distance approximately equal to the thickness of the upper edge 36 of the lower annular wall 34 of the housing 30. This permits the tabs 62 to extend into the housing 30 and contact the lip 38, preventing lateral movement of the insert 50 within the housing 30, while the outer radial edge 60 of the collar 58 extends such that it is approximately flush with the outer surface of the reduced diameter portion 35 of the lower annular wall 34.

At least some of the tabs 62 include hooks 64. As shown in FIGS. 2 and 3, each of the hooks 64 projects radially outward with respect to the respective tab 62 from which it extends. In the preferred embodiment shown in FIG. 4, three of the six tabs 62 include hooks 64, and the tabs 62 including the hooks 64 alternate along the circumference of the collar 58 with those not including hooks 64. Alternatively, the number of tabs 62 including hooks 64 could be increased or decreased, or every tab 62 could include a hook 64.

Referring again to FIGS. 2 and 3, the hooks 64 are configured to engage the slots 42 formed in the lip 38 when the insert 50 is disposed within the housing 30. The hooks 64 may be elastically deformable, to permit snapping engagement with the slots 42. The hooks 64 are resiliently deflected in a radially inward direction by the lip 38 during insertion of the insert within the housing 30, and move radially outward back into a relaxed state once they have reached their respective slots 42, thus forming a snapping engagement with the slots 42. The insert 50 can then be removed from the housing 30 by moving the insert 50 axially upwards with respect to the housing 30, causing the hooks 64 slide out from the slots 42 in a radially inward direction, until they have disengaged from the slots 42 and the insert 50 can be moved in an upward direction and out from the housing 30.

The insert 50 is thus removably retained within the housing 30 when the hooks 64 are engaged with the slots 42 as described above. As shown in FIG. 4, the slots 42 have a circumferential length, measured from a first end 44 to a second end 46 thereof, which is greater than a width of a corresponding hook 64 received in that slot 42. This permits the hooks 64 to slide within the slots 64, permitting a limited amount of rotation of the insert 50 within the housing 30.

Figure 1:
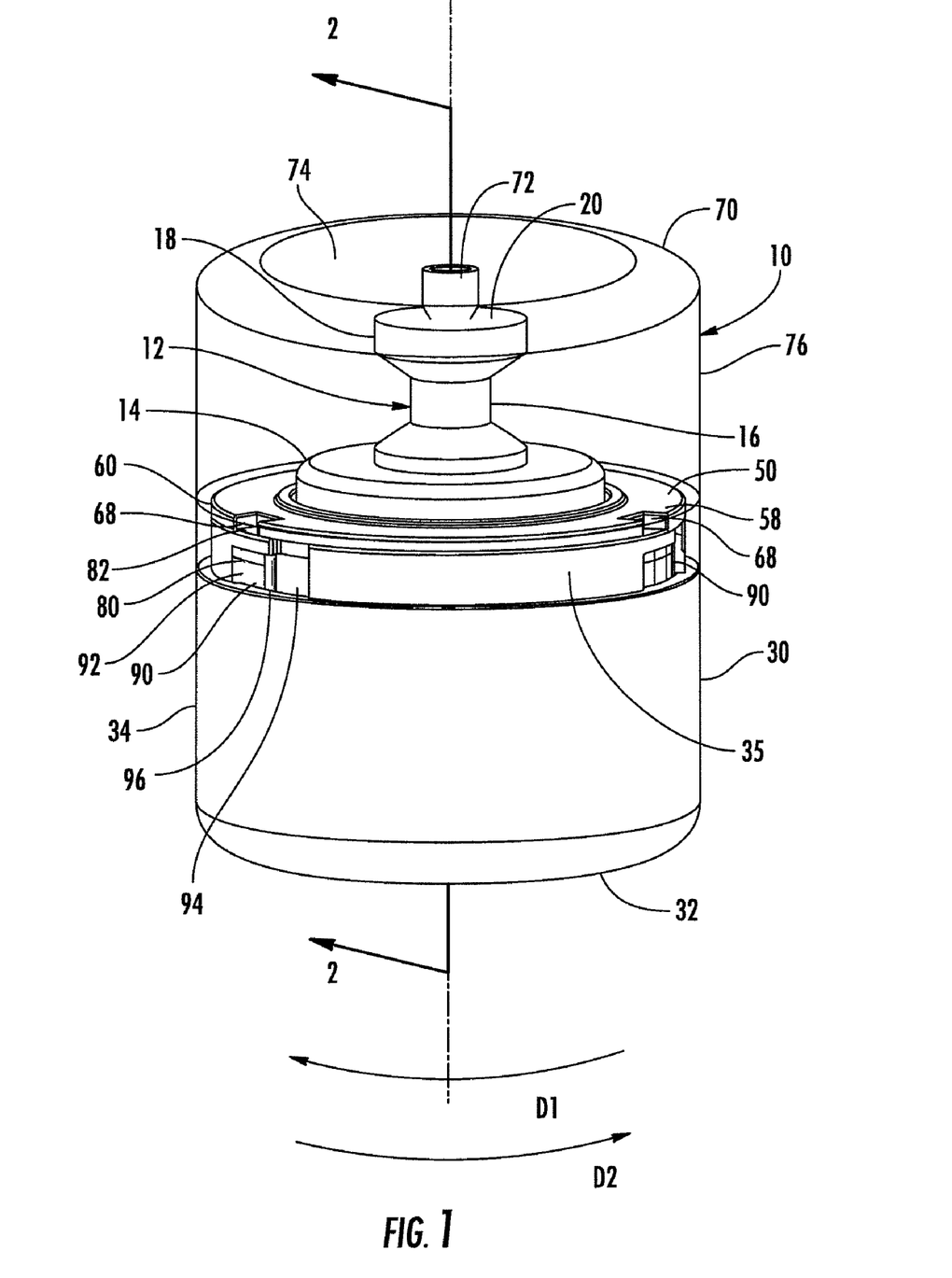
FIG. 1 is a top perspective view of the weight case in the assembled configuration and housing a weight, with the cap locked thereon.
Figure 7:
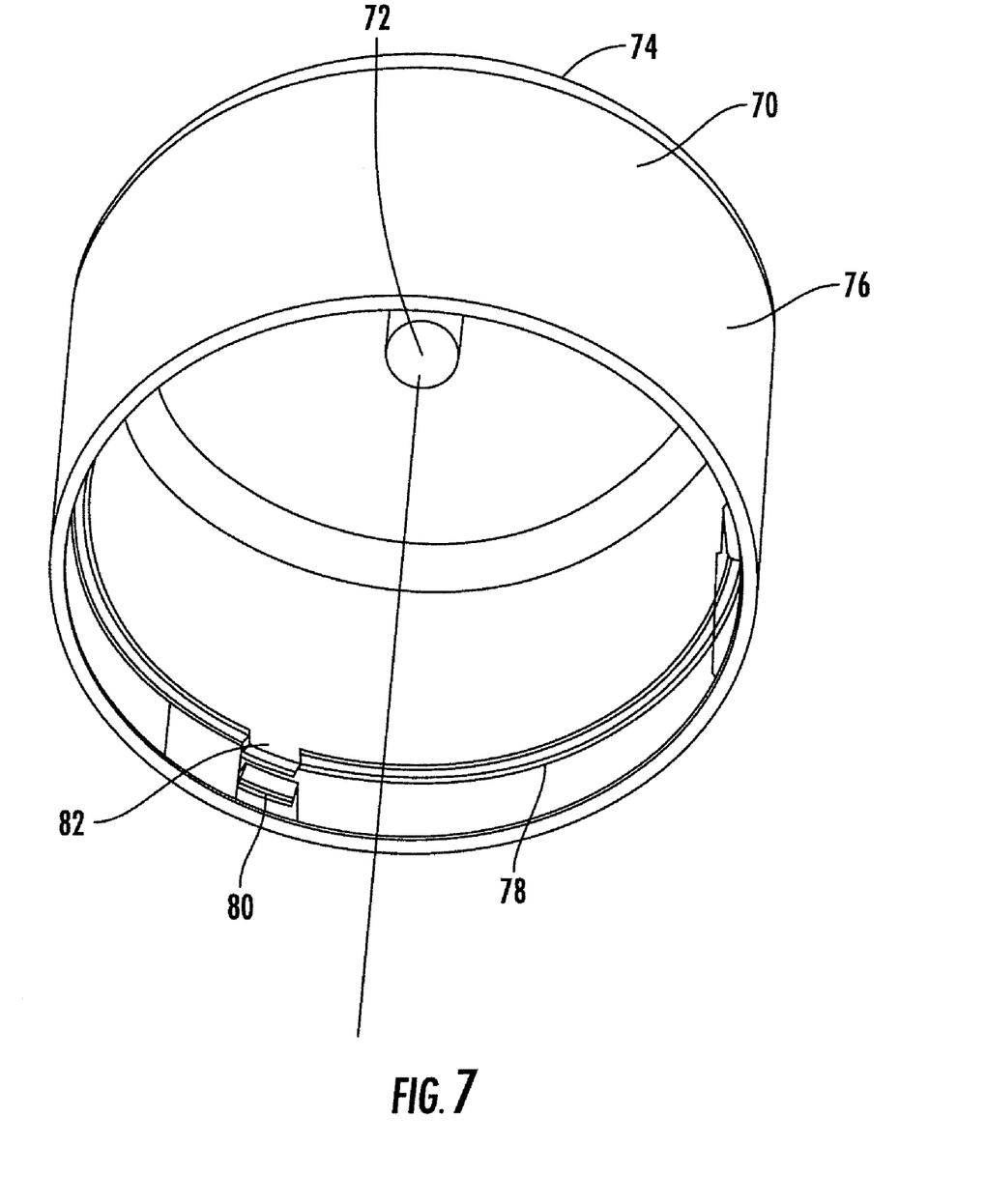
FIG. 7 is a bottom perspective view of the cap of FIG. 1.
Figure 8:
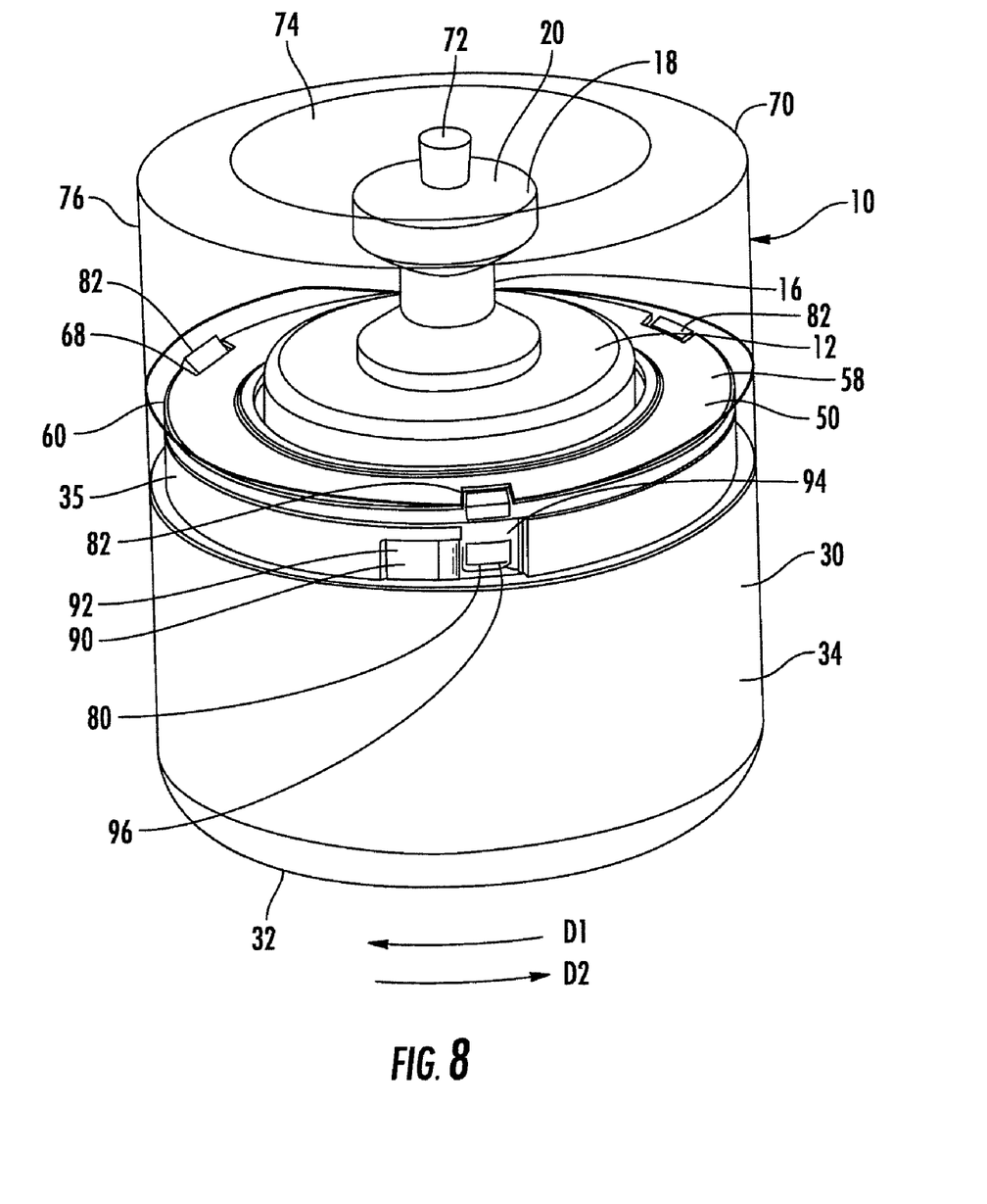
FIG. 8 is a top perspective view of the weight case of FIG. 1, with the cap disposed thereon in an unlocked position.

Referring to FIGS. 1-4, 7, and 8, the container 10 is also provided with a lid 70, that can be removably placed on the housing to enclose the insert 50 and the weight or object 12. The lid 70 includes a top wall 74 and an annular side wall 76 extending downward from the top wall 74 to form upper annular wall of the container 10. In the embodiment shown the lid 70 is transparent, to permit viewing of the interior of the container 10 and the weight 12 when the lid 70 is disposed on the housing 30. In other embodiments the lid 70 may be opaque. As shown in FIGS. 1 and 8, the container 10 defines a substantially cylindrical shape when the lid 70 is disposed on the housing 30.

The lid 70 includes an object engaging portion 72, shown in FIGS. 1, 2, 4, 7, and 8. In the preferred embodiment, the object engaging portion 72 is a resilient bumper that extends downward from the top wall 74 of the lid and contacts the upper surface 20 of the weight 12, to prevent relative movement between the weight 12 and the container 10, which could cause abrasion of material from the weight 12.

As best shown in FIGS. 4, 5, and 7, the housing 30 and lid 70 include respective mating surfaces. In the embodiment shown, the mating surfaces are circumferentially extending shoulders 40, 78. As shown, an outer circumferential shoulder 40 is formed at the reduced diameter portion 35 of the lower annular wall 34 of the housing 30. A matching inner circumferential shoulder 78 is formed near a lower edge of the upper annular wall 76 of the lid. The shoulders 40, 78 can be aligned and engaged to place the lid 70 on the housing 30.

The lid 70 is configured to rotate on the housing 30 to create a locking engagement therewith, while simultaneously rotating the insert 50, and thus the weight 12, to prevent relative movement between the insert 50, the lid 70, and the weight 12, and in particular to prevent relative rotation between the surfaces contacting the weight 12 and the weight 12, including the bumper 72 and insert 50.

With reference to FIGS. 1-4 and 7, the lid 70 includes locking projections 80 configured to engage a first counter structure 92 on the housing 30, and driving projections 82 configured to engage a second counter structure 68 on the insert 50. In the illustrated embodiment, each locking projection 80 is paired with a corresponding driving projection 82. Each of the pairs of projections 80, 82 are located on an inner surface of the upper annular wall 76, below the shoulder 78 in axial alignment with each other, with the driving projection 82 located above the locking projection. The pairs of projections 80, 82 are equal in number to, and have the same spacing about the circumference of the upper annular wall 76, to that of the hooks 64 about the circumference of the collar 58, although this is not a necessary feature of the invention.

As shown in FIGS. 1, 4, 5, 7, and 8, the housing 30 includes L-shaped recesses 90 defined on an outer surface of the lower annular wall 34, preferably in the area of the reduced diameter portion 35. Each L-shaped recess 90 includes a circumferentially extending portion 92 and a vertically extending portion 94, and is defined between the shoulder 40 and the upper edge 36 of the reduced diameter portion 35. The circumferentially extending portion 92 is the first counter structure, and thus configured for engagement with the locking projection 80 of the lid 70, as explained in greater detail below. A ridge 96, shown in FIG. 4, extends vertically in the embodiment shown, and separates the circumferentially extending 92 portion and the vertically extending portion. The L-shaped recesses 90 are equal in number to, and have a the same spacing about the circumference of the lower annular wall 34 of the housing 30 to that of the pairs of projections 80, 82 about the upper annular wall 76, so that each locking projection 80 can engage a corresponding circumferentially extending portion 92 of a respective L-shaped recess 90. In the embodiment shown, the L-shaped recesses 90 are also equal in number to and generally radially aligned with the slots 42 on the inner lip 38 of the housing 30, although this is not a necessary feature of the invention.

FIGS. 1-6 and 8 show the second counter structures 68 formed on the insert 50. The second counter structures 68 in the embodiment shown are notches defined along the outer radial edge 60 of the collar 58. The notches are equal in number to, and have a the same spacing about the circumference of the outer radial edge 60 of the collar 58 to that of the pairs of projections about the upper annular wall 76, so that each driving projection 82 can engage a corresponding notch 68. In the embodiment shown, the notches 68 are radially aligned on the collar 58 with the tabs 62 including hooks 64, such that each tab 62 having a hook 64 extends downward from a radially inner edge of a respective notch 68, but such an arrangement is not necessary to the invention.

To enclose the weight 12 within the container 10, the insert 50 is placed within the housing 30 with the hooks 64 engaging the slots 42, as described above, and the notches 68 axially aligned with the vertically extending portions 94 of the L-shaped recesses 90. The weight 12 is placed in the receptacle 52 of the housing 30, and the lid 70 is placed over the housing 30 such that the bumper 72 contacts the upper surface 20 of the weight 12. While placing the lid 70 on the housing 30, the projections 80, 82 are aligned with the notch 68 and vertically extending portion 94 of the L-shaped recess 90. The lid 70 is moved downward on the housing 30 until the shoulder 78 of the lid 70 comes to rest on the shoulder 40 of the housing.

At this point the lid 70 is in a removal position with respect to the housing 30, as shown in FIG. 8. Each lower locking projection 80 is disposed within a vertically extending portion 94 of a respective L-shaped recess 90, and circumferentially aligned with the circumferentially extending portion 92. The upper driving projections 82 are each located within a respective notch 68 of the collar 58.

To move the lid 70 from the removal position, described above, to a locking position, in which it is axially locked on the housing 30, the lid 70 is rotated in a direction D1 to move the lower locking projections 80 past the ridges 96, and into the circumferential portions 92 of the L-shaped recesses 90. During rotation of the lid 70, the upper driving projections 82 cause the insert 50 to rotate simultaneously with the lid 70, by acting against respective first edges 67 of notches 68. During rotation of the insert 50, the hooks 64 also slide within the respective slots 42 in which they are engaged. Each of the hooks 64 is preferably located in contact with the first end 44 of a respective slot 42 when the lid is in the first removal position and with the second end 46 when the lid is in the second locking position.

The lid 70 is shown in the locking position in FIG. 1. As shown, the ridges 96 retain the locking projections 82 within the circumferential portions 92, such that a predetermined level of force must be applied to move the locking projections 80 past the ridges 96 to move the lid 70 back into the removal position. The locking projections 82 are further blocked from moving upwards by a portion of the lower annular wall 34 between the upper edge 36 of the lower annular wall 34 and the circumferential portion 92 of the L-shaped recess 90, preventing the lid 70 from being moved axially upwards with respect to the housing 30.

To move the lid 70 from the locking position to the removal position, the lid 70 is rotated in an opposite direction D2 to that described above, to move the locking projections 80 past the ridges 96 and from the circumferential portions 92 to the vertical portions 94 of the L-shaped recesses 90. While this is occurring, the driving projections 82 act against the respective second edges 69 of the notches, causing the insert 50 to rotate in direction D2 simultaneously with the lid 70. Once the locking projections 80 are disposed within the vertically extending portions 94 of the L-shaped recesses 90, the lid 70 is in the unlocking position and can be moved upwards and thus removed from the housing 30.

The components of the container 10 may be made of any suitable material that permits formation of a rigid structure, and preferably allows for a snapping engagement between the hooks 64 and slots 42, as described above. For example, the components may be made out of a plastic, such as polycarbonate, or other polymeric materials. Other suitable materials would be easily recognized by a person of ordinary skill in the art and the invention should not be considered limited by the materials used.

While the preferred embodiments of the invention have been described in detail above, the invention is not limited to the specific embodiments described which should be considered as merely exemplary. In particular, while the invention has been described as for housing a precision weight, it should be understood that the invention is not limited to such, and other objects can be housed within the container as well.

What is claimed is:

1. A container for storing an object, comprising:
a housing;
an insert movably disposed within the housing and defining a receptacle for receiving an object;
a lid removably located on the housing that encloses the insert, an object engaging portion of the lid for contacting an object;
the lid is rotatable on the housing from a first, removal position, to a second, locking position in which at least one locking projection on the lid engages a first counter structure on the housing; and
at least one driving projection on the lid engages a second counter structure on the insert to rotate the insert with the lid relative to the housing as the lid rotates to the second, locking position.

2. The container of claim 1, wherein the object engaging portion of the lid is a resilient bumper located on an inner surface of the lid.

3. The container of claim 1, wherein the insert is supported on an upper edge of the housing.

4. The container of claim 1, wherein the housing comprises a base and a lower annular wall extending upward therefrom, and the lid comprises a top wall and an upper annular wall extending downward therefrom.

5. The container of claim 4, wherein the container defines a cylindrical shape.

6. The container of claim 4, wherein an upper edge of the lower annular wall includes an outer circumferential shoulder, and a lower edge of the upper annular wall includes an inner circumferential shoulder that mates with the outer circumferential shoulder.

7. The container of claim 4, wherein the insert comprises a collar having an outer radial edge supported by an upper edge of the lower annular wall.

8. The container of claim 7, wherein a plurality of tabs extend downward from the collar and contact an inner surface of the lower annular wall.

9. The container of claim 8, wherein the housing further comprises an inner lip having a plurality of slots, and at least some of the tabs include hook portions that engage the slots.

10. The container of claim 9, wherein each one of the slots has a first end and a second end, and respective ones of the hook portions are each located in contact with the first end when the lid is in the first removal position, and in contact with the second end when the lid is in the second locking position, to limit rotation of the insert with respect to the housing.

11. The container of claim 7, wherein the at least one driving projection is located on an inner surface of the upper annular wall, and the second counter structure is located on the outer radial edge of the collar.

12. The container of claim 11, wherein the second counter structure comprises at least one notch that receives the at least one driving projection.

13. The container of claim 4, wherein an outer surface of the lower annular wall includes at least one L-shaped recess including the first counter structure, and the at least one locking projection is received by the at least one L-shaped recess to lock the lid on the base.

14. The container of claim 13, wherein the at least one L-shaped recess includes a vertical portion and a circumferential portion, the first counter structure is the circumferential portion, and a vertical ridge extends between the circumferential portion and the vertical portion, to retain the at least one locking projection within the circumferential portion when the lid is in the second locking position.

15. A combination of an object and a container for storing the object, comprising:
the object; and
the container, including a housing, an insert movably disposed within the housing and defining a receptacle having the object located therein, and a lid removably located on the housing that encloses the insert and the object such that an object engaging portion of the lid is in contact with the object;
the lid is rotatable on the housing from a first, removal position, to a second, locking position in which at least one locking projection on the lid engages a first counter structure on the housing; and
at least one driving projection on the lid engages a second counter structure on the insert to rotate the insert and the object with the lid relative to the housing as the lid rotates to the second, locking position.

16. The combination of claim 15, wherein the object comprises a precision weight.

17. The combination of claim 15, wherein the object engaging portion is a resilient bumper that contacts the object to prevent relative movement between the object, the lid, and the housing.

18. A method of enclosing an object within a container, comprising:
providing a container including a housing, with an insert movably disposed within the housing and defining a receptacle, and a lid;
placing an object in the receptacle;
placing the lid over the housing such that an object engaging portion of the lid contacts the object;
engaging at least one driving projection on the lid with at least one second counter structure on the insert; and
rotating the lid with respect to the housing from a first, removal position to a second, locking position in which at least one locking projection of the lid engages at least one first counter structure on the housing, while simultaneously rotating the insert with the lid relative to the housing and preventing relative movement between the object, the insert, and the lid.

19. The method of claim 18, wherein
the housing includes a base and an annular wall extending upwards therefrom;
the insert includes a collar extending from the receptacle; and
the method further comprises placing the insert within the housing such that an upper edge of the annular wall supports the collar, before placing the lid over the housing.

20. The method of claim 19, wherein:
the housing includes at least one L-shaped recess and having a circumferential portion and a vertical portion, the at least one first counter structure is the circumferential portion, and a vertical ridge extends between the circumferential portion and the vertical portion;
the method further comprising sliding the at least one locking projection within the vertical portion while placing the lid over the housing, then sliding the at least one locking projection within the circumferential portion, past the vertical ridge, while rotating the lid with respect to the housing.

21. The method of claim 20, wherein the at least one second counter structure is a notch included in the collar, the method further comprising placing the at least one driving projection within the notch while sliding the at least one locking projection within the vertical portion.

* * * * *